United States Patent [19]
Sakurai et al.

[11] 3,916,852
[45] Nov. 4, 1975

[54] INTAKE MIXTURE HEATING DEVICE FOR INTERNAL COMBUSTION ENGINE

[75] Inventors: Yoshitoshi Sakurai, Kawasaki; Satoru Ohata, Oi, both of Japan

[73] Assignee: Honda Giken Kogyo Kabushiki Kaisha, Tokyo, Japan

[22] Filed: July 6, 1973

[21] Appl. No.: 377,065

[30] Foreign Application Priority Data
July 7, 1972  Japan.......................... 47-79752[U]

[52] U.S. Cl. ......... 123/75 B; 123/32 R; 123/32 ST; 123/122 AB
[51] Int. Cl............................................. F02b 17/00
[58] Field of Search............... 123/32, 75 B, 122 AB; 138/156

[56] References Cited
UNITED STATES PATENTS
431,028  7/1890  Bayles................................ 138/158
3,543,736  12/1970  Suzuki et al. ......................... 123/32
3,613,738  10/1971  Witzig................................. 138/156

*Primary Examiner*—Wendell E. Burns
*Assistant Examiner*—James W. Cranson, Jr.
*Attorney, Agent, or Firm*—Lyon & Lyon

[57] ABSTRACT

An internal combustion engine of the type having a main combustion chamber and an auxiliary combustion chamber connected by a torch nozzle, contains apparatus for heating a rich mixture supplied to the auxiliary combustion chamber. The heating apparatus comprises a metal pipe formed of two half sections joined longitudinally, the pipe being positioned within an exhaust passage leading from the main combustion chamber. The pipe is secured to the exhaust passage only at the ends of the pipe and not at intermediate positions along the length of the pipe, in order to accommodate thermal expansion without cracking.

8 Claims, 2 Drawing Figures

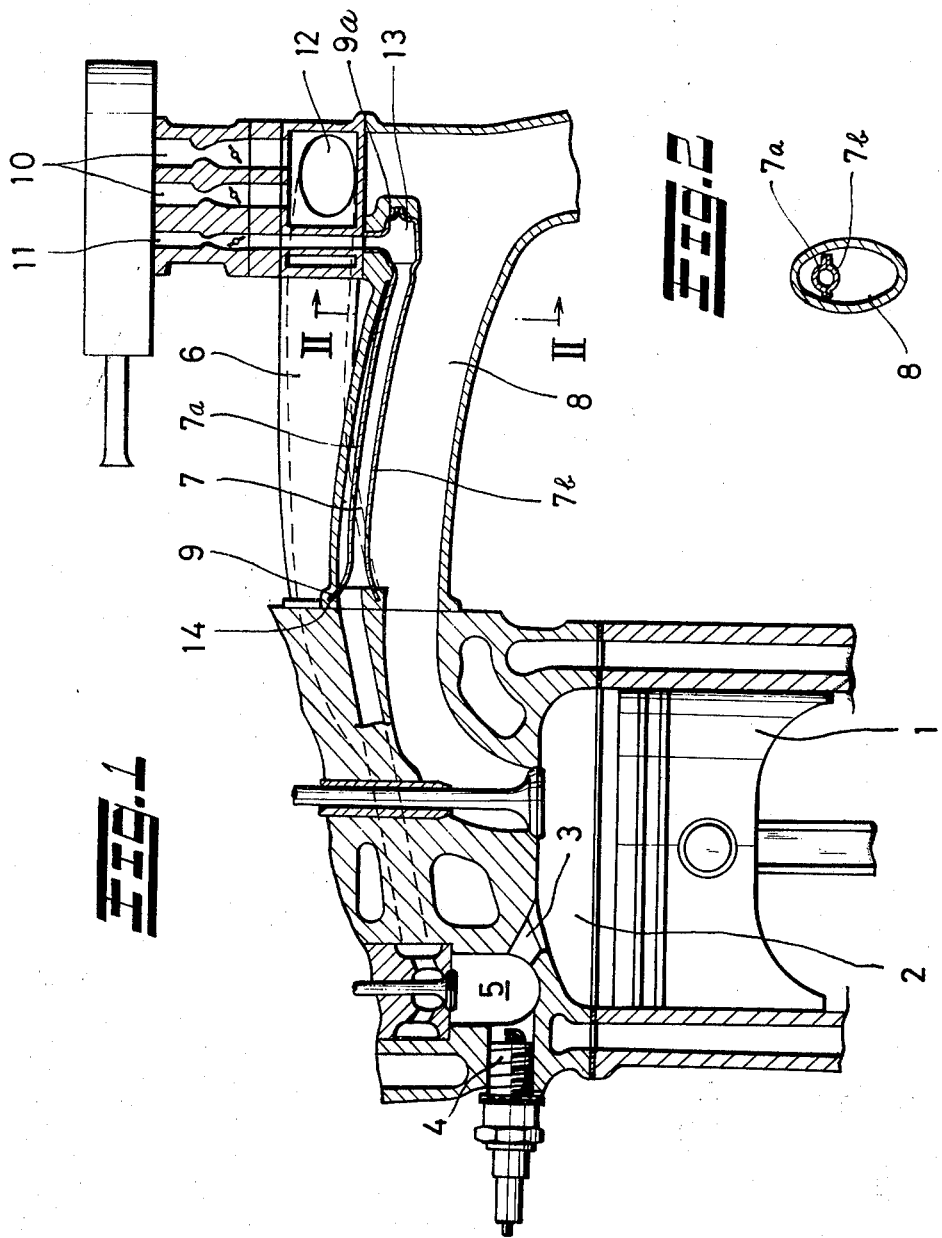

INTAKE MIXTURE HEATING DEVICE FOR INTERNAL COMBUSTION ENGINE

This invention relates to internal combustion engines having a main combustion chamber associated with each piston, together with an auxiliary combustion chamber communicating with the main chamber through a torch nozzle. A rich air-fuel mixture is supplied to the auxiliary chamber and ignited by a spark plug to project a flame through the torch nozzle to burn a lean air-fuel mixture supplied to the main chamber. It is important to minimize condensation of the rich mixture delivered to the auxiliary chamber in order to prevent the formation of droplets of fuel on the walls of the auxiliary chamber. Such fuel condensation droplets interfere with optimum combustion.

In order to minimize condensation of the rich mixture, a pipe through which the rich mixture is delivered is placed in heat exchange relationship with the exhaust pipe leading from the main combustion chamber, so that the heat of the exhaust gases may heat the incoming rich mixture to the auxiliary chamber.

In accordance with this invention, a thin wall metal pipe is located within the exhaust passage carrying the hot exhaust gases from the main combustion chamber. This thin wall pipe extends longitudinally of the exhaust passage and is totally enveloped thereby. Only the ends of the thin wall metal pipe are fixed relative to the cast member which forms a part of the exhaust manifold, and the thin wall pipe is not secured at intermediate locations between its ends, thereby minimizing any tendency toward cracking caused by differential thermal expansion.

Other and more detailed objects and advantages will appear hereinafter.

In the drawings,

FIG. 1 is a sectional side elevation showing a preferred embodiment of this invention.

FIG. 2 is a sectional detail taken substantially on the lines II—II as shown in FIG. 1.

Referring to the drawings, an internal combustion engine having a reciprocating piston 1 contains a main combustion chamber 2, one wall of the chamber being formed by the piston. A torch nozzle 3 connects the auxiliary combustion chamber 5 with the main combustion chamber 2, and a spark plug 4 is employed to ignite the mixture in the auxiliary chamber 5. An intake passage 6 delivers a lean air-fuel mixture to the main chamber 2 through a valved inlet, not shown. A thin wall metal pipe 7 supplies a rich air-fuel mixture to the auxiliary chamber 5. This pipe 7 is formed of two mating halves 7a and 7b having edge rib portions joined together longitudinally from end to end. The pipe 7 is positioned within the exhaust passage 8 but is secured only at its ends 9 and 9a to the member forming the exhaust passage 8. The end 9 is preferably cast in place within the flange 14 and the end 9a is cast in place within the riser 13 to form a liner for the riser 13.

The main carburetor 10 is located upstream from the main intake passage 6 and the auxiliary carburetor 11 is located upstream of the auxiliary intake passage 7. These carburetors 10 and 11 are provided at their lower ends with a main riser 12 located on the upper surface of the exhaust passage 8 and an auxiliary riser 13 formed by the member forming the exhaust passage 8 and the expanded portion of the pipe 7 and the respective intake passages 6, 7 for each cylinder extends nearly horizontally from these risers 12 and 13 so that the mixtures, after they have been heated in the risers 12 and 13 to maintain good vaporization of fuel are delivered to the combustion chambers through intake passages 6 and 7.

The construction shown and described is superior to an earlier form of heat exchange apparatus in which the auxiliary intake passage 7 and the exhaust passage 8 were formed from a single common thin sheet of metal. This earlier construction proved unsatisfactory because of cracking induced by thermal expansion stresses. The metal pipe 7 constructed in accordance with this invention is constructed separately and then placed within the exhaust passage 8 so as to extend along the same and is secured thereto only at its ends 9 and 9a. Thus the strains caused by a difference in temperature are absorbed by the unsupported central portion of the pipe 7 so as not to produce any crack, and in addition the pipe 7 is totally enveloped within the exhaust passage 7 so that the heat from the exhaust gases is effective over the whole or nearly whole circumference of the central portion of the pipe 7, so that heating efficiency is improved.

As shown in the drawings, the rich mixture delivered through the pipe 7 from the auxiliary carburetor 11 passes through a valved intake passage to the auxiliary combustion chamber 5. The lean mixture passes through the intake passage 6 to a valved inlet, not shown, to the main combustion chamber 2.

Having fully described our invention, it is to be understood that we are not to be limited to the details herein set forth but that our invention is of the full scope of the appended claims.

We claim:

1. In an internal combustion engine, the combination of: walls including a piston forming a main combustion chamber, walls forming an auxiliary combustion chamber, means forming a torch nozzle connecting said chambers, spark ignition means associated with the auxiliary chamber, means forming an intake passage for delivering a rich mixture to the auxiliary chamber, means forming an intake passage for delivering a lean mixture to the main chamber, means including a member forming an exhaust passage for conducting exhaust gases from the main chamber, a portion of the auxiliary chamber intake passage comprising a metal pipe enveloped within the exhaust passage and secured relative to the exhaust passage member only at the ends of the metal pipe thereof which extend into the body of said member.

2. The combination set forth in claim 1 wherein said means forming an exhaust passage includes a casting having a flange, said metal pipe extending to and terminating at said flange, said flange including a passage communicating with the interior of said metal pipe.

3. The combination set forth in claim 2 wherein said flange is located immediately adjacent the cylinder head and said passage through said flange extends to the cylinder head.

4. The combination set forth in claim 1 wherein said means forming an exhaust passage includes a riser cavity, said metal pipe extending to line said riser cavity.

5. In an internal combustion engine, the combination of: walls including a piston and a cylinder head forming a main combustion chamber, walls including said cylinder head forming an auxiliary combustion chamber, means forming a torch nozzle connecting said chambers, spark ignition means associated with the auxiliary chamber, a main riser, an auxiliary riser, means forming an intake passage for delivering a lean mixture from said main riser to said main combustion chamber, a casting forming an exhaust passage for conducting exhaust gases from the main combustion chamber past said main and auxiliary risers, said casting including a flange extending into said exhaust passage adjacent said cylinder head and means forming an intake passage for delivering a rich mixture from said auxiliary riser to said auxiliary chamber, said intake passage means for said auxiliary chamber including a metal pipe extending from said flange to said auxiliary riser within said exhaust passage, said pipe being secured to said casting and at the ends of said metal pipe.

6. The combination set forth in claim 5 wherein said metal pipe is anchored into said flange at one end of said metal pipe and is anchored into said casting forming said exhaust passage at said auxiliary riser.

7. The combination of claim 5 wherein said flange includes a passage communicating with the interior of said metal pipe and extending to said cylinder head.

8. The combination as set forth in claim 5 wherein said metal pipe extends to form a liner for said auxiliary riser.

* * * * *